United States Patent
Huang et al.

(10) Patent No.: US 11,222,244 B2
(45) Date of Patent: Jan. 11, 2022

(54) METHOD AND DEVICE OF ACQUIRING APPEARANCE MODEL, COMPUTER DEVICE AND STORAGE MEDIUM

(71) Applicant: Shenzhen University, Shenzhen (CN)

(72) Inventors: Hui Huang, Shenzhen (CN); Zihao Yan, Shenzhen (CN); Ruizhen Hu, Shenzhen (CN)

(73) Assignee: Shenzhen University, Shenzhen (CN)

(*) Notice: Subject to any disclaimer, the term of this patent is extended or adjusted under 35 U.S.C. 154(b) by 0 days.

(21) Appl. No.: 16/920,667

(22) Filed: Jul. 4, 2020

(65) Prior Publication Data
US 2021/0279522 A1 Sep. 9, 2021

(30) Foreign Application Priority Data
Mar. 6, 2020 (CN) .......................... 202010152181.5

(51) Int. Cl.
*G06K 9/62* (2006.01)
*G06T 7/33* (2017.01)

(52) U.S. Cl.
CPC ......... *G06K 9/6262* (2013.01); *G06K 9/6232* (2013.01); *G06K 9/6256* (2013.01); *G06T 7/344* (2017.01); *G06T 2207/10028* (2013.01); *G06T 2207/20081* (2013.01)

(58) Field of Classification Search
CPC combination set(s) only.
See application file for complete search history.

(56) References Cited

U.S. PATENT DOCUMENTS

| | | | |
|---|---|---|---|
| 2004/0001620 A1* | 1/2004 | Moore | G06K 9/6211 382/154 |
| 2018/0218510 A1* | 8/2018 | Taguchi | G06K 9/6267 |

* cited by examiner

*Primary Examiner* — Ross Varndell
(74) *Attorney, Agent, or Firm* — Kilpatrick Townsend & Stockton, LLP

(57) ABSTRACT

A method and a device of acquiring an appearance model, a computer device and a storage medium. The method includes acquiring a set of target point clouds, the set of target point clouds including at least two point clouds, each of the point clouds being obtained by sampling a local area of a target object; then performing a registration and a completion for the at least two point clouds to obtain a processed point cloud, wherein the registration is to transform different point clouds into a same coordinate system, and the completion is to add points in other areas of the object according to existing points in a point cloud to be completed; and finally acquiring the appearance model of the target object according to the processed point cloud. The method can improve applicability of the appearance model of the target object acquired only by registration technique.

13 Claims, 10 Drawing Sheets

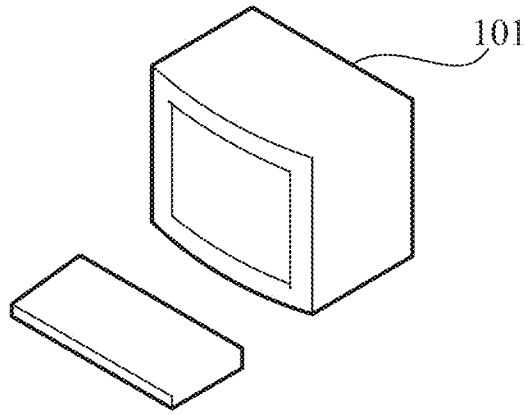

FIG. 1

```
┌─────────────────────────────────────────────────────────────────┐
│ the terminal acquires a set of target point clouds, where the   │
│ set of target point clouds includes at least two point clouds,  │──201
│ and each of the point clouds is obtained by sampling a local    │
│ area of a target object                                         │
└─────────────────────────────────────────────────────────────────┘
                                 │
                                 ▼
┌─────────────────────────────────────────────────────────────────┐
│ the terminal performs a registration and a completion for the   │
│ at least two point clouds to obtain a processed point cloud,    │
│ where the registration is to transform different point clouds   │──202
│ into a same coordinate system, and the completion is to add     │
│ points in other areas of the object according to existing       │
│ points in a point cloud to be completed                         │
└─────────────────────────────────────────────────────────────────┘
                                 │
                                 ▼
┌─────────────────────────────────────────────────────────────────┐
│ the terminal acquires the appearance model of the target object │──203
│ according to the processed point cloud                          │
└─────────────────────────────────────────────────────────────────┘
```

FIG. 2 the terminal inputs the point cloud to be completed into the second encoder to obtain a second feature vector of the point cloud to be completed — 601 the terminal inputs the second feature vector of the point cloud to be completed into the second decoder, and adds, by the second decoder, points in other areas of the object according to the second feature vector of the point cloud to be completed — 602

FIG. 9 the terminal acquires a training data set and a verification data set, the training data set and the verification data set each include complete appearance models of a plurality of objects — 701 the terminal trains an initial registration network and an initial completion network by using the training data set to obtain a trained registration network and a trained completion network — 702 the terminal inputs the verification data set into the trained registration network and the trained completion network, and calculates comprehensive loss values of the trained registration network and the trained completion network from a loss function, and the comprehensive loss values include a loss value of the trained registration network and a loss value of the trained completion network — 703

FIG. 10

METHOD AND DEVICE OF ACQUIRING APPEARANCE MODEL, COMPUTER DEVICE AND STORAGE MEDIUM

CROSS-REFERENCE TO RELATED APPLICATION

This application claims benefits of Chinese Patent Application No. 202010152181.5, entitled "METHOD AND DEVICE OF ACQUIRING APPEARANCE MODEL, COMPUTER DEVICE AND STORAGE MEDIUM", filed on Mar. 6, 2020, the technical disclosure of which is hereby incorporated by reference in its entirety.

FIELD

The present application relates to a field of computer technology, and more particularly relates to a method and a device of acquiring an appearance model, a computer device and a storage medium.

BACKGROUND

With the development of computer technology, an appearance model acquisition technology appears, and the appearance model acquisition technology mainly aims to obtain a complete appearance shape of an object. In the appearance model acquisition technology, a complete appearance model of the object can be constructed from point clouds (sets of points) of two different local areas of the surface of the object.

In the related art, the complete appearance model of the object can be constructed by aligning the point clouds of the surface of the object. Registration refers to transforming the point clouds of the two different local areas of the surface of the object into a same coordinate system, so as to obtain connected relations between the point clouds of different areas of the surface of the object in the same coordinate system, and finally obtain a complete appearance model of the object.

However, in the related registration technique, the complete appearance shape of the object can be obtained only when an overlap of two local areas of the surface of the object is larger, where point clouds of the two local areas are obtained. For the point clouds of the two local areas without an overlap, or the overlap of which is smaller, the complete appearance model of the object cannot be well obtained. Therefore, the related registration technology has a problem of poor applicability.

SUMMARY

Based on this and in view of the above-described technical problems, it is necessary to provide a method and a device of acquiring an appearance model, a computer device and a storage medium, which are capable of improving applicability.

In a first aspect, a method for acquiring an appearance model is provided, the method includes:

acquiring a set of target point clouds, the set of target point clouds including at least two point clouds, wherein each of the point clouds is obtained by sampling a local area of a target object;

performing a registration and a completion for the at least two point clouds to obtain a processed point cloud, wherein the registration is to transform different point clouds into a same coordinate system, and the completion is to add points in other areas of the object according to existing points in a point cloud to be completed; and acquiring the appearance model of the target object according to the processed point cloud.

In one of the embodiments, the performing the registration and the completion for the at least two point clouds to obtain a processed point cloud, includes:

performing the registration for the at least two point clouds to obtain a first aligned point cloud; and performing the completion for the first aligned point cloud to obtain a first completed point cloud, and using the first completed point cloud as the processed point cloud.

In one of the embodiments, the performing the registration and the completion for the at least two point clouds to obtain a processed point cloud, includes:

performing the completion for the at least two point clouds respectively to obtain at least two second completed point clouds; and performing the registration for the at least two second completed point clouds to obtain a second aligned point cloud, and using the second aligned point cloud as the processed point cloud.

In one of the embodiments, the registration includes: inputting different point clouds into a registration network, and transforming, by the registration network, the different point clouds into the same coordinate system; and the completion includes: inputting the point cloud to be completed into a completion network, and adding, by the completion network, points in other areas of the object according to the existing points in the point cloud to be completed.

In one of the embodiments, the registration network includes a first encoder and a first decoder, and the inputting the different point clouds into the registration network, and transforming, by the registration network, the different point clouds into the same coordinate system include:

inputting the different point clouds into the first encoder to obtain first feature vectors of the different point clouds;

merging the first feature vectors of the different point clouds to obtain a merged first feature vector;

inputting the first merged feature vector into the first decoder to obtain transformation parameters between the different point clouds; and transforming the different point clouds into the same coordinate system according to the transformation parameters.

In one of the embodiments, the completion network includes a second encoder and a second decoder, and the inputting the point cloud to be completed into the completion network, and adding, by the completion network, points in other areas of the object according to the existing points in the point cloud to be completed include:

inputting the point cloud to be completed into the second encoder to obtain a second feature vector of the point cloud to be completed; and inputting the second feature vector of the point cloud to be completed into the second decoder, and adding, by the second decoder, points in other areas of the object according to the second feature vector of the point cloud to be completed.

In one of the embodiments, the method further includes:

acquiring a training data set and a verification data set, wherein the training data set and the verification data set each include complete appearance models of a plurality of objects;

training an initial registration network and an initial completion network by using the training data set to obtain a trained registration network and a trained completion network; and inputting the verification data set into the trained registration network and the trained completion network, and calculating comprehensive loss values of the trained registration network and the trained completion network from a loss function, wherein the comprehensive loss values including a loss value of the trained registration network and a loss value of the trained completion network.

In a second aspect, a device of acquiring an appearance model is provided, the device includes:

a first acquiring module, configured to acquire a set of target point clouds, wherein the set of target point clouds includes at least two point clouds, and each of the point clouds is acquired by sampling a local area of a target object;

a processing module, configured to perform a registration and a completion for the at least two point clouds to obtain a processed point cloud, wherein the registration is to transform different point clouds into a same coordinate system, and the completion is to add points in other areas of the object according to the existing points in a point cloud to be completed; and a second acquiring module, configured to acquire the appearance model of the target object according to the processed point cloud.

In one of the embodiments, the processing module is specifically configured to: perform the registration for the at least two point clouds to obtain a first aligned point cloud; perform the completion for the first aligned point cloud to obtain a first completed point cloud; and use the first completed point cloud as the processed point cloud.

In one of the embodiments, the processing module is specifically configured to: perform the completion for the at least two point clouds respectively to obtain at least two second completed point clouds; perform the registration for the at least two second completed point clouds to obtain a second aligned point cloud; and use the second aligned point cloud as the processed point cloud.

In one of the embodiments, the registration includes inputting different point clouds into a registration network, and the registration network transforming the different point clouds into the same coordinate system; and the completion includes inputting the point cloud to be completed into a completion network, and the completion network adding points in other areas of the object according to the existing points in the point cloud to be completed.

In one of the embodiments, In the embodiment of the present application, the registration network includes a first encoder and a first decoder, and the processing module 802 is specifically configured to: input the different point clouds into the first encoder to obtain first feature vectors of the different point clouds; merge the first feature vectors of the different point clouds to obtain a first merged feature vector; input the first merged feature vector into the first decoder to obtain transformation parameters between the different point clouds; and transform, by the first decoder, the different point clouds into the same coordinate system according to the transformation parameters.

In one of the embodiments, the completion network includes a second encoder and a second decoder, and the processing module is specifically configured to: input the point cloud to be completed into the second encoder to obtain a second feature vector of the point cloud to be completed; and input the second feature vector of the point cloud to be completed into the second decoder, and add points in other areas of the object according to the second feature vectors of the point cloud to be completed through the second decoder.

In one of the embodiments, the device further includes a training module, and the training module is configured to: acquire a training data set and a verification data set, where the training data set and the verification data set includes complete appearance models of a plurality of objects; train an initial registration network and an initial completion network by using the training data set to obtain a trained registration network and a trained completion network; and input the verification data set into the trained registration network and the trained completion network, and calculate comprehensive loss values of the trained registration network and the trained completion network by using a loss function, where the comprehensive loss values includes a loss value of the trained registration network and a loss value of the trained completion network.

In a third aspect, a computer device is provided, and the computer device includes a memory which stores a computer program and a processor which implements any one of the methods of acquiring the appearance model in the first aspect described above when executing the computer program.

In a fourth aspect, a computer-readable storage medium is provided, and on the computer-readable storage medium a computer program is stored, and the computer program implements any of the methods for acquiring the appearance model in the first aspect described above when executed by a processor.

In the method and the device for acquiring the appearance model, the computer device and the storage medium, a set of target point clouds is acquired, the set of target point clouds includes at least two point clouds, and each of the point clouds is obtained by sampling a local area of a target object; then a registration and a completion are performed for the at least two point clouds to obtain a processed point cloud, where the registration is to transform different point clouds into the same coordinate system, and the completion is to add points in other areas of the object according to the existing points in a point cloud to be completed; and finally the appearance model of the target object is acquired according to the processed point cloud. In the present application, the registration combining with the completion is performed for the point clouds collected from the local areas of the target object, therefore, completing the aligned point cloud is easier than completing the independent point clouds, and aligning the completed point cloud is easier due to a higher overlap rate thereof. Therefore, in the present application, in the case that there is no high overlap rate of the acquired point clouds of the local areas of the target object, the appearance model of the target object can still be obtained by performing both registration and completion, thereby improving the applicability of the appearance model of the target object acquired only by the registration technique.

BRIEF DESCRIPTION OF THE DRAWINGS

FIG. 1 is an application environment diagram of a method for acquiring an appearance model of an embodiment.

FIG. 2 is a flow chart of the method for acquiring the appearance model of an embodiment.

FIG. 9 is a flow chart of a method of the completion network processing the point cloud according to the method for acquiring the appearance model of an embodiment.

FIG. 10 is a flow chart of a method for training the registration network and the completion network of an embodiment.

DETAILED DESCRIPTION OF THE EMBODIMENTS

Figure 3:
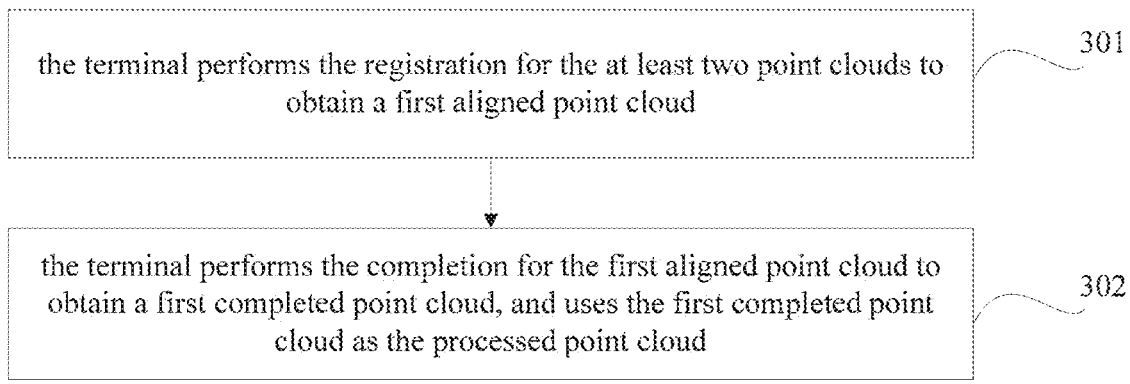
FIG. 3 is a flow chart of a method for obtaining a processed point cloud according to the method for acquiring the appearance model of an embodiment.

In order to make the objectives, technical solutions and advantages of the present application more clearly and better understood, the present application will be further described in detail below with reference to the accompanying drawings and embodiments. It should be understood that the specific embodiments described herein are merely intended to explain the present application but not intended to limit the present application.

A method for acquiring an appearance model provided by the present application can be applied to an application environment as shown in FIG. 1. A terminal 101 can be, but is not limited to, various personal computers, notebook computers, smart phones, tablet computers, three-dimensional scanners and portable wearable devices.

In an embodiment, as shown in FIG. 2, a method for acquiring an appearance model is provided. Taking the method applied to the terminal 101 in FIG. 1 as an example, the method includes following steps:

In step 201, the terminal acquires a set of target point clouds. The set of target point clouds includes at least two point clouds. Each of the point clouds is obtained by sampling a local area of a target object.

In this step, the point cloud refers to a set of data points on the external surface of an object obtained by a measuring instrument. Usually, the number of points obtained by using a three-dimensional coordinate measuring device is relatively small, and distances between the points is also relatively large, then the cloud point is called a sparse point cloud; whereas the number of points obtained by using a three-dimensional laser scanner or a photographic scanner is relatively large, and the points are relatively dense, then the point cloud is called a dense point cloud. For example, an Artec Spider scanner or a Microsoft Kinect v2 scanner can be used.

In step 202, the terminal performs a registration and a completion for the at least two point clouds to obtain a processed point cloud, wherein the registration is to transform different point clouds into a same coordinate system, and the completion is to add points in other areas of the object according to existing points in a point cloud to be completed.

There is no strict requirements for a sequence of the registration and the completion in this step. That is, perform the registration first and then the completion, or perform the completion first and then the registration.

Since point cloud includes points sampled and collected by a scan device from the target object from different angles. In general, the coordinate systems of the points in different point clouds are different. In order to establish a complete appearance model of the target object, the different point clouds are necessarily presented in a unified coordinate system. The registration is required in order to present the point clouds of different coordinate systems in the same coordinate system. The registration aims to acquire transformation parameters through which the point clouds in different coordinate systems can be transformed into the same coordinate system. By the registration, positional relationships between different point clouds can be clearly shown in the same coordinate system.

On the other hand, the collected point cloud includes only the points of the local area of the target object, therefore an individual point cloud cannot fully show the complete appearance model of the target object, and the completion needs to be performed for the collected point cloud. The completion is to add points of the rest of the target object according to the acquired point clouds of the local areas of the target object.

In step 203, the terminal acquires the appearance model of the target object according to the processed point cloud.

In this step, the processed point cloud used by the terminal are acquired by processing the point cloud in an order of performing registration first and then completion, or in an order of performing completion first and then registration. Alternatively, the terminal can combine a completed shape obtained by performing registration first and then completion with transformation parameters obtained by performing completion first and then registration, so as to obtain the processed point cloud. The processed point cloud can well show the overall shape of the object and the positional relationships between the point clouds of the object.

In the method for acquiring the appearance model described above, a set of target point clouds is acquired, and the set of target point clouds includes at least two point clouds; each of the point clouds is obtained by sampling a local area of the target object; then the registration and the completion are performed for the at least two point clouds to obtain the processed point cloud, where the registration is to transform different point clouds into the same coordinate system, and the completion is to add points in the other areas of the object according to the existing points in the point cloud to be completed; and finally the appearance model of the target object is acquired according to the processed point cloud. In the present application, the registration combining with the completion is performed for the point clouds collected from the local areas of the target object, therefore, completing the aligned point cloud is easier than completing the independent point clouds, and aligning the completed point cloud is easier due to a higher overlap rate thereof.

Therefore, in the present application, in the case that there is no high overlap rate of the acquired point clouds of the local areas of the target object, the appearance model of the target object can still be obtained by performing both registration and completion, thereby improving the applicability of the appearance model of the target object acquired only by the registration technique.

In an embodiment of the present application, referring to FIG. 3, a method for obtaining the processed point cloud according to a method for acquiring the appearance model is provided. The method for obtaining the processed point cloud includes:

In step 301, the terminal performs the registration for the at least two point clouds to obtain a first aligned point cloud.

In step 302, the terminal performs the completion for the first aligned point cloud to obtain a first completed point cloud, and uses the first completed point cloud as the processed point cloud.

In the embodiment of the present application, completing the aligned point clouds is easier. Because the positional relationships between the aligned point clouds are more definite, there is a condition limitation for a position when completion for the point clouds is performed, thereby avoiding adding the point clouds in error areas. So a mode of performing registration first and then complement is more convenient and accurate than a mode of only performing complement.

Figure 4:
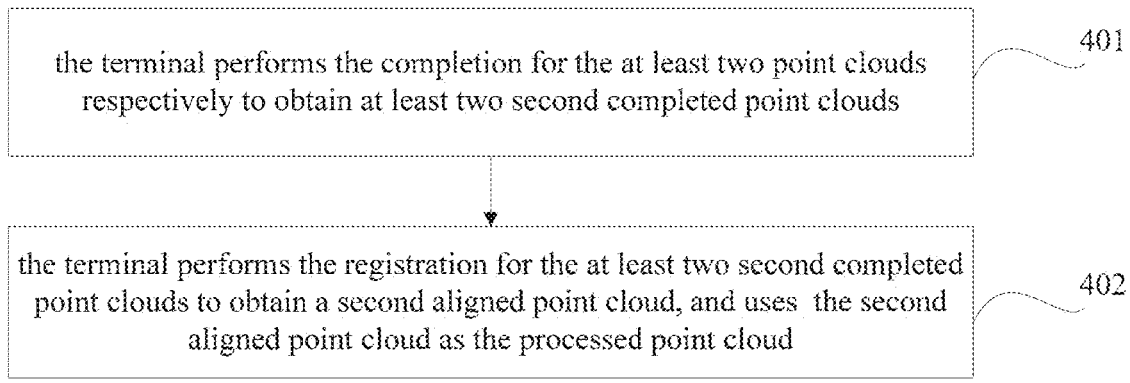
FIG. 4 is a flow chart of a method for obtaining a processed point cloud according to the method for acquiring the appearance model of an embodiment.

In an embodiment of the present application, referring to FIG. 4, a method for obtaining the processed point cloud according to another method for acquiring the appearance model is provided. The method for obtaining the processed point cloud includes:

In step 401, the terminal performs the completion for the at least two point clouds respectively to obtain at least two second completed point clouds.

In step 402, the terminal performs the registration for the at least two second completed point clouds to obtain a second aligned point cloud, and uses the second aligned point cloud as the processed point cloud.

In the embodiment of the present application, there is a larger probability to occur an overlap area between the different point clouds after completion. In the case of an increased the overlap area, the registration is easier. The advantages of the mode of performing the complement first and then the registration will be described below with reference to the comparison in practice.

A comparison is made between the method combining the completion with the registration in the present application (simply, a two-way joint network, represented by "Ours" in Table 1), a conventional global registration method which can globally align incomplete or complete point clouds (represented by "4PCS" in Table 1), a deep learning registration method which performs trains and tests by using incomplete scan point cloud pairs as inputs (represented by "DCP" in Table 1), and a single registration network which is trained and tested by using incomplete scan point cloud pairs as inputs (represented by "Registration" in Table 1).

In Table 1, prediction errors of the above methods are listed, wherein $E_\theta$ represents a rotation error, and $E_t$ represents a shift error. It can be seen that the prediction error of the method "4PCS" is the largest, and a reason is that, in the method "4PCS", it is assumed that there is an overlap between input pairs to a certain degree, while the data points of the present application mainly includes point cloud pairs without overlap. Compared with the method "4PCS", the method "DCP" creates a smaller error, which, however, is greater than the error of the registration method "Ours". Because a key idea of the method "DCP" is to find related points between two point sets, the method "DCP" also failed for the data set of the present application. It can be seen that the method "Ours" is optimal relative to the other three methods, and it indicates that even if the method "Ours" uses incomplete point clouds pairs without overlap as inputs, the obtained result is approximate to a result acquired by the method "Ours" using complete point clouds as inputs.

TABLE 1

|  | 4PCS | DCP | Registration | Ours |
|---|---|---|---|---|
| $E_\theta$ | 73.574 | 38.044 | 18.225 | 14.961 |
| $E_t$ | 0.262 | 0.176 | 0.139 | 0.084 |

In an embodiment of the present application, the registration includes: the terminal inputs different point clouds into a registration network, and the registration network transforms the different point clouds into the same coordinate system.

The completion includes: the terminal inputs the point cloud to be completed into a completion network, and the completion network adds points in other areas of the object according to the existing points in the point cloud to be completed.

Compared with a single registration-completion path or a single completion-registration path, in the embodiment of the present application, the registration network combining with the completion network can achieve a better effect in processing the point clouds in different local areas of the target object.

Figure 5:
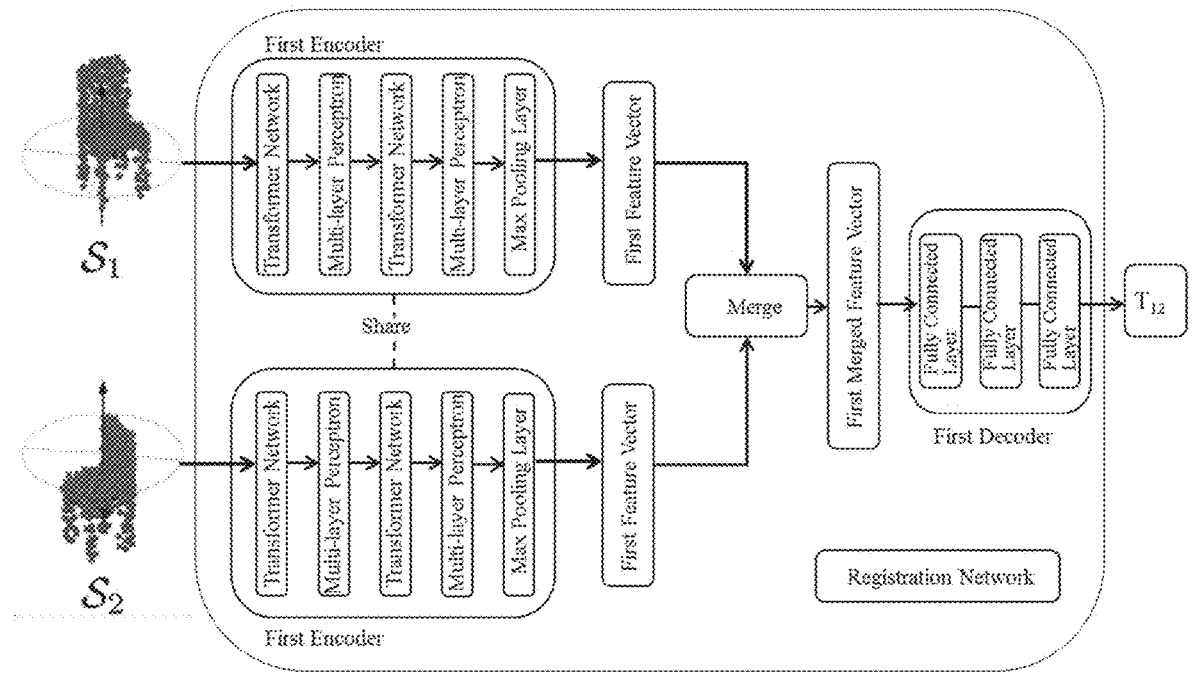
FIG. 5 is a schematic diagram of a registration network of an embodiment.
Figure 6:
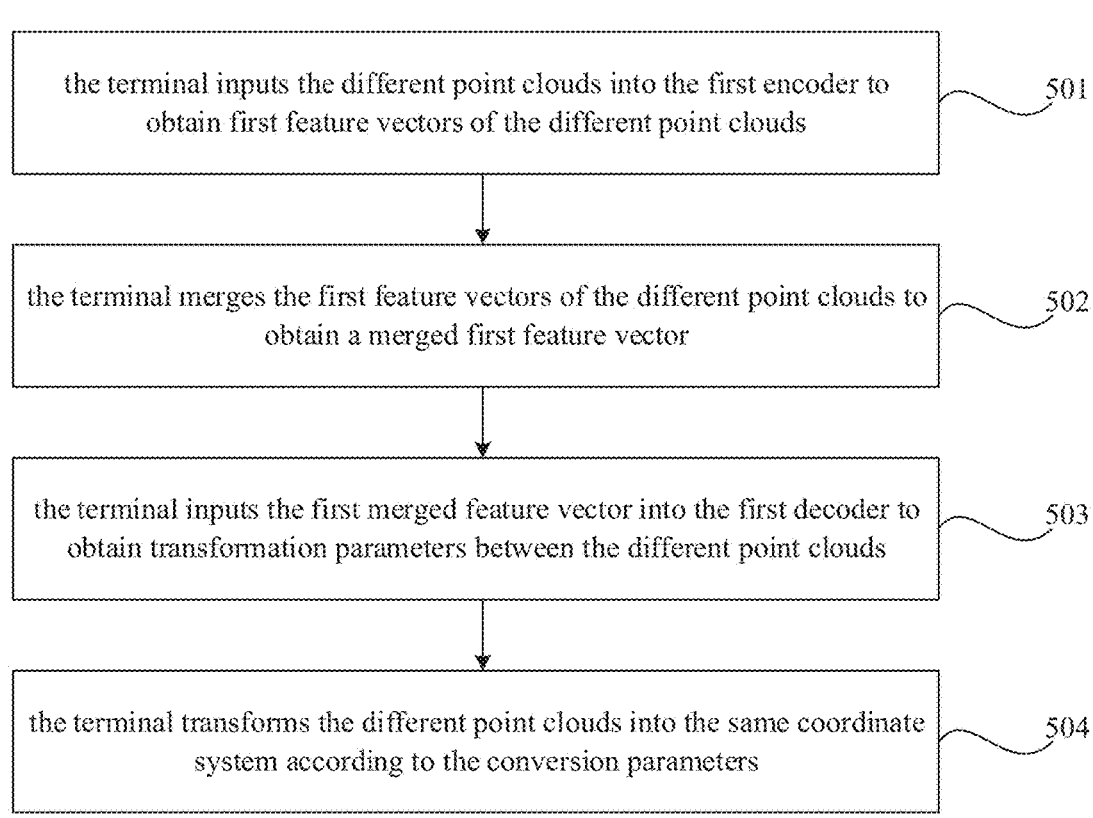
FIG. 6 is a flow chart of a method of the registration network processing the point clouds according to the method for acquiring the appearance model of an embodiment.

In an embodiment of the present application, FIG. 5 is a schematic diagram of the registration network. The registration network includes a first encoder and a first decoder. In FIG. 6, a method of the registration network processing the point clouds according to the method for acquiring the appearance model is provided. The method of the registration network processing the point clouds includes:

In step 501, the terminal inputs the different point clouds into the first encoder to obtain first feature vectors of the different point clouds.

In step 502, the terminal merges the first feature vectors of the different point clouds to obtain a first merged feature vector.

In step 503, the terminal inputs the first merged feature vector into the first decoder to obtain transformation parameters between the different point clouds.

In step 504, the terminal transforms the different point clouds into the same coordinate system according to the transformation parameters.

For better understanding, the above steps are described in detail below. The registration network receives inputs of complete or incomplete shapes S1 and S2, and outputs relative transformation parameters T12 from S1 to S2 with reference to S2. Specifically, first the input pair is transmitted into the first encoder formed by PointNet, a deep learning model processing point cloud data, to obtain the first 521-dimensional feature vector. Then the feature vector of S1 is merged with S2 to form a 1024-dimensional vector, and the 1024-dimensional vector is transmitted into the first decoder including multiple fully connected layers, to obtain the transformation parameters T21. Since the model is only allowed to rotate around a vertical direction, the transformation parameters can be represented by four parameters ($\theta$, dx, dy, dz). In addition to the above inputs, the registration network can also change the input sequence to obtain another set of transformation parameters T21 from S2 to S1.

Figure 7:
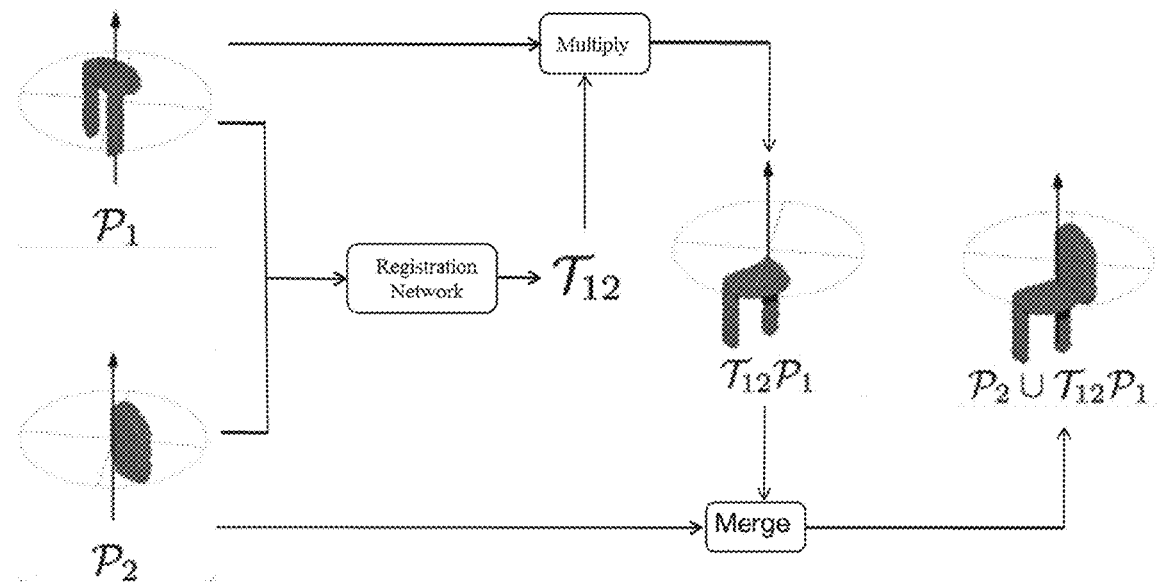
FIG. 7 is a schematic diagram of the registration network of another embodiment.

In addition, referring to FIG. 7, in the registration-completion path, the registration network receives inputs P1 and P2, aligns P1 with P2, combines the two and obtains P2∪T12×P1 after completion. Since the number of points of the aligned point cloud is twice that of each incomplete point cloud, the aligned point cloud is sampled to make the number of points of the sampled point cloud be half of the number of points of the original aligned point cloud, to ensure that the number of points of each point cloud in the path is consistent. In the embodiment of the present application, a registration result of the input point clouds can be obtained quickly by encoding and decoding the input point clouds.

Figure 8:
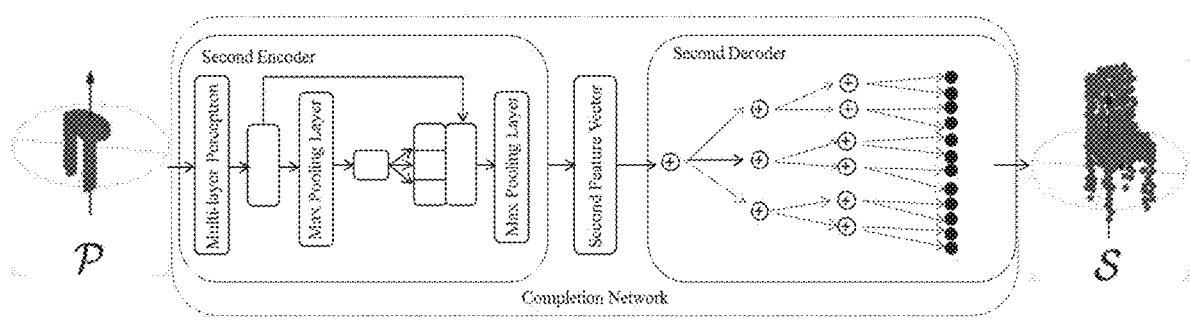
FIG. 8 is a schematic diagram of a completion network of an embodiment.

FIG. 8 is a schematic diagram of the completion network of an embodiment of the present application. The completion network includes a second encoder and a second decoder. In FIG. 9, a method of the completion network processing the point cloud according to the method for acquiring the appearance model is provided. The method of the completion network processing the point cloud includes:

In step 601, the terminal inputs the point cloud to be completed into the second encoder to obtain a second feature vector of the point cloud to be completed.

In step 602, the terminal inputs the second feature vector of the point cloud to be completed into the second decoder, and the second decoder adds points in other areas of the object according to the second feature vector of the point cloud to be completed.

For better understanding, the above steps are described in detail below. As shown in FIG. 8, the completion network receives an input of incomplete shape P, and outputs a complete shape S. Specifically, first the shape P is transmitted into the second encoder including a point cloud completion network (PCN) which extracts the second 1024-dimensional feature vector. Then the second 1024-dimensional feature vector is transmitted into the second decoder (TopNet Decoder), to obtain the complete shape S. For the initial point cloud pair input into the completion-registration path, or the aligned point cloud in the registration-completion path, the completion network completes each incomplete shape. In the embodiment of the present application, the completed point cloud of the input point cloud can be quickly obtained by encoding and decoding the input point cloud.

In an embodiment of the present application, referring to FIG. 10, a method for training the registration network and the completion network is provided. The method includes:

In step 701, the terminal acquires a training data set and a verification data set, the training data set and the verification data set each include complete appearance models of a plurality of objects.

In step 702, the terminal trains an initial registration network and an initial completion network by using the training data set to obtain a trained registration network and a trained completion network.

In step 703, the terminal inputs the verification data set into the trained registration network and the trained completion network, calculates comprehensive loss values of the trained registration network and the trained completion network from a loss function, where the comprehensive loss values include a loss value of the trained registration network and a loss value of the trained completion network.

In the embodiment of the present application, in order to train the two-way joint network, the loss function adapted thereto is designed. The loss function not only takes into account different types of outputs, but also ensures consistency constraint between two paths. The loss function of the two-way joint network is defined as $L=\omega_c L_c + \omega_r L_r + \omega_s L_s$.

Where $L_c$ is a completion loss relative to a true value; $L_r$ a registration loss relative to true value; and $L_s$ is a loss for ensuring consistency between the two paths. The values of the three weights $\omega_c$, $\omega_r$ and $\omega_s$ herein are respectively set to 50, 1, and 0.5.

The completion loss is a sum of the loss of the completion output of the registration-completion path (denoted by R-C) relative to a true value thereof and the loss of the completion-registration path (denoted by C-R) relative to a true value thereof, which is defined as $L_C = L_c^{R-C} + L_c^{C-R}$, where, $$L_c^{C-R} = (D_c(S_1^{C-R}, S_1^*) + D_c(S_2^{C-R}, S_2^*))/2,$$

$$L_c^{R-C} = (D_c(S_1^{R-C}, S_1^*) + D_c(S_2^{R-C}, S_2^*))/2$$

Where, $D_c$ is a chamfer distance, configured to measure a degree of geometric deformation between the two shapes.

The registration loss is a sum of the loss of the registration output result of the registration-completion path (denoted by R-C) relative to a true value thereof and the loss of the completion-registration path (denoted by C-R) relative to a true value thereof, which is defined as $L_r = L_r^{R-C} + L_r^{C-R}$, wherein, $$L_r^{C-R} = (D_r(\tau_{12}^{C-R}, \tau_{12}^*) + D_r(\tau_{21}^{C-R}, \tau_{21}^*))/2,$$

$$L_r^{R-C} = (D_r(D_r(\tau_{12}^{R-C}, \tau_{12}^*) + D_r(\tau_{21}^{R-C}, \tau_{21}^*))/2$$

Where $D_r$ is a measure between two geometric transformations, and defined by a mean square error of four parameters. It should be noted that a model as the true value is placed at an origin of coordinates and normalized into a unit cube.

The consistency loss consists of three parts: $L_s = \omega_{sc} L_s^C + \omega_{sr} L_s^R + \omega_{st} L_s^T$.

Where, $L_s^C$ is defined as a consistency loss of the complement between the two paths; $L_s^R$ is defined as a consistency loss of the registration between the two paths; and $L_s^T$ is defined as a consistency loss between the two relative transformations obtained by taking each of the two shapes as a reference. Specifically:

$$L_s^C = (D_c(S_1^{C-R}, S_1^{R-C}) + D_c(S_2^{C-R}, S_2^{R-C}))/2,$$

$$L_s^R = (D_r(\tau_{12}^{C-R}, \tau_{12}^{R-C}) + D_r(\tau_{21}^{C-R}, \tau_{21}^{R-C}))/2,$$

$$L_s^T = (D_r(\tau_{12}^{R-C}, \tau_{21}^{C-R}, I) + D_r(\tau_{12}^{R-C}, \tau_{21}^{R-C}, I))/2$$

Where, I is a 4×4 unit matrix, and the weight values $L_s^T$, $\omega_{sr}$, and $\omega_{st}$ are set to be 50, 1, 5 by default.

After training the registration network and the completion network, the performances of the trained networks can be judged qualitatively and quantitatively.

Figure 11:
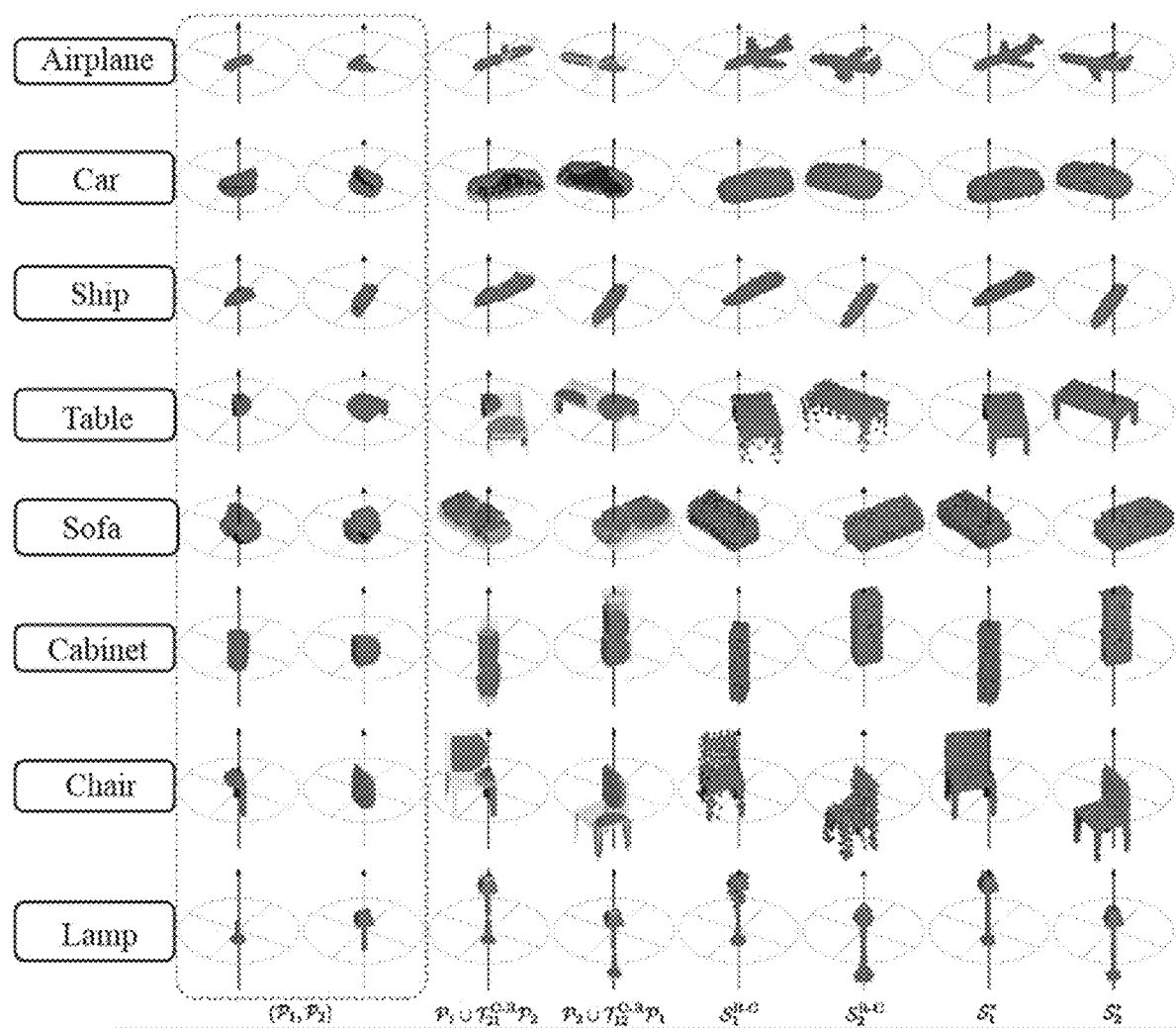
FIG. 11 is a schematic diagram illustrating test results of eight objects acquired by trained registration network and completion network of an embodiment.

First, the network performances of the trained networks are judged qualitatively. FIG. 11 shows visualization examples of the registration and completion results. Inputs of shape pairs are placed in the center of the origin, as shown in the first two columns in the figure. Taking any incomplete shape as a reference, the present method can well align the other shape with the reference shape, as shown in the third column and the fourth column in the figure. It can be seen that the present method can still achieve accurate registration results even though there is no overlap between most of shape pairs in the figure. Moreover, due to the loss $L_s^T$ described above, as for the same input pair, the aligned models obtained corresponding to different references are very similar. The fifth and sixth columns show the completed shape of each shape, and the last two columns show the corresponding true values. As can be seen from the figure, the completion module in the present method can also achieve good results when processing an input pair with different orientations, and by performing the registration and the completion simultaneously, there is no need to pre-align the input pair before completion. It should be noted that the registration results and the completion results are output respectively by the completion-registration path and the registration-completion path, mainly because the two paths can improve each other's performance, and the final output of each path under the constraint of the consistency loss can be more reliable.

In order to illustrate the generalization ability of the present method, real data of eight objects are collected manually with scanner to act as test data. As for a small object with fine textures, such as an airplane, a car, a ship, or a lamp, is scanned with an Artec Spider scanner. While a larger object is scanned with a Microsoft Kinect v2 scanner. The eight objects shown from top to bottom in FIG. 11 include airplane, car, ship, table, sofa, cabinet, chair and lamp.

Each object is scanned from two different view angles to obtain two incomplete point clouds from the same model. If the overlap rate of the two incomplete shapes obtained by twice scanning is too large, the two shapes will be clipped to ensure that the overlap rate is as small as possible (less than 30%). Then, each shape is placed at the origin of the coordinates, and since no scaling is performed in the transformation process, a scaling value is estimated by transforming a complete fusion model into a unit cube. After this, the two incomplete shapes are input into the registration network and the completion network of the present application to obtain the registration result. It should be noted that since real objects are placed in a vertical direction, the scanned results are always vertical, and no further additional processing is required.

Figure 12:
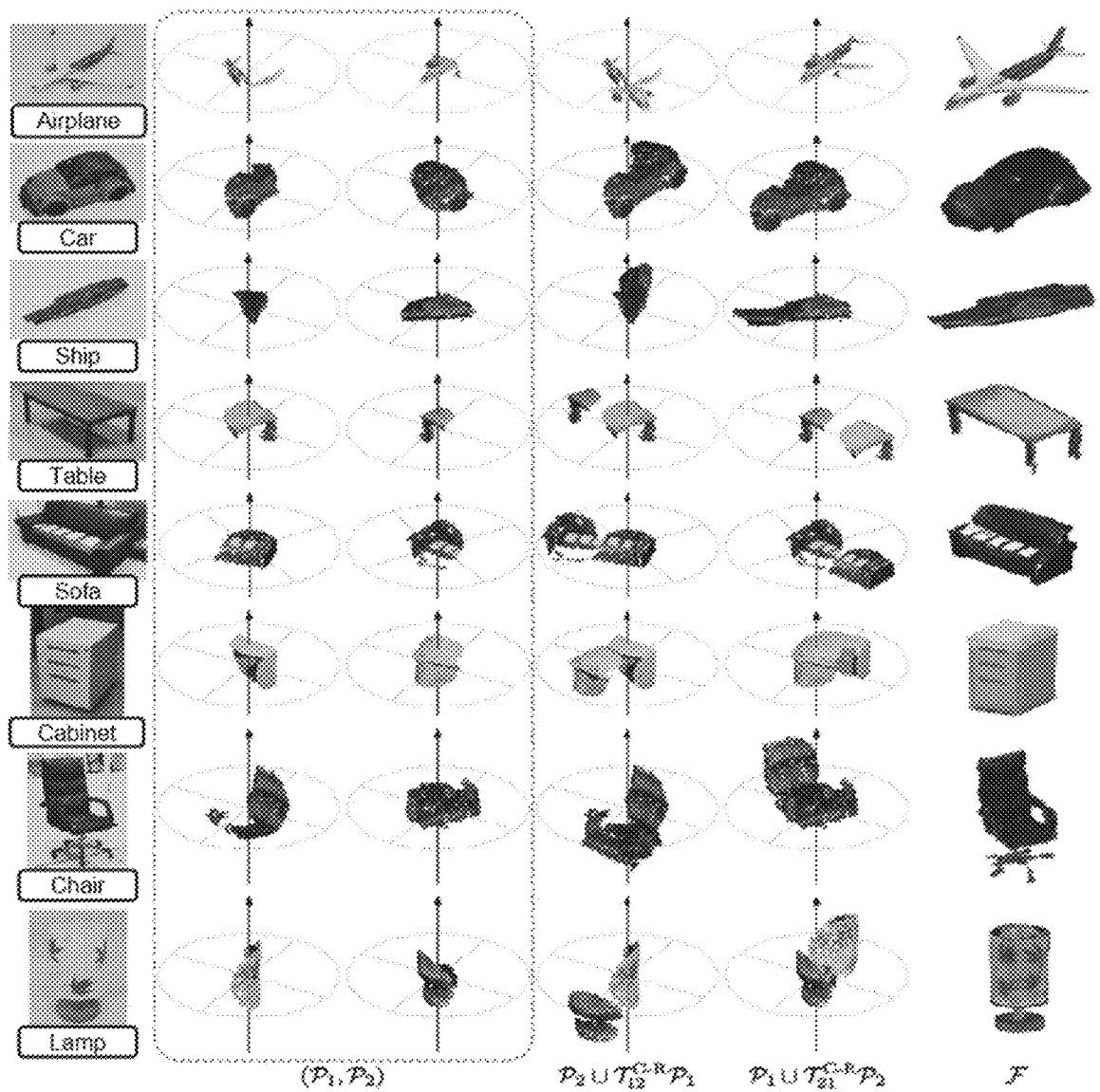
FIG. 12 is a schematic diagram illustrating test results of real scanned data of an embodiment.

FIG. 12 shows test results for real scanned data. The first column shows an image of each real model; the following two columns show input partial point clouds captured by the scanner; the fourth and fifth columns each show the registration results of one partial point cloud by taking another partial point cloud as a reference; and the last column F shows a complete fusion shape obtained. It can be seen that the present method can still achieve accurate registration results for data with low overlap rate and noise. For example, although the two shapes of partial of the table in the fourth row originally do not overlap each other, and are both located at the origin of the coordinates, the present method can still achieve accurate rotation results and restore the distance between the two shapes. The eight objects shown from top to bottom in FIG. 12 include airplane, car, ship, table, sofa, cabinet, chair and lamp.

Next, the network performances of the trained networks are judged quantitatively. By calculating the predicted geometric transformation parameters and errors of the reconstructed point cloud, quantitative evaluation results of the registration network and the completion network are provided. As for the registration, the rotation error and the shift error are calculated respectively. The rotation error is measured by degree and calculated from an absolute difference between the predicted value and the true value. The translation error is measured by a normalized unit and calculated from the distance L1 between the predicted value and the true value. $E_\theta$ and $E_t$ represent the rotation error and the translation error respectively:

$$E_\theta = (|\theta_{12}^{C-R} - \theta_{12}^*| + |\theta_{21}^{C-R} - \theta_{21}^*|)/2 \times 180/\pi,$$

$$E_t = (|t_{12}^{C-R} - t_{12}^*| + |t_{21}^{C-R} - t_{21}^*|)/2$$

Where, $\theta$ and t represent a rotation angle and a shift vector respectively obtained by decomposing a transformation matrix T.

The error of the completion result $E_c$ is calculated from a chamfering distance between the reconstructed value and the true value:

$$E_c = (D_c(S_1^{R-C}, S_1^*) + D_c(S_2^{R-C}, S_2^*))/2 \times 10^3.$$

Table 2 shows the errors of the results for all eight objects.

TABLE 2

|  | Airplane | Car | Ship | Table | Sofa | Cabinet | Chair | Lamp | Average value |
|---|---|---|---|---|---|---|---|---|---|
| $E_\theta$ | 6.817 | 4.191 | 7.702 | 22.798 | 9.856 | 15.071 | 19.823 | 33.428 | 14.961 |
| $E_t$ | 0.068 | 0.082 | 0.087 | 0.099 | 0.078 | 0.093 | 0.075 | 0.092 | 0.084 |
| $E_c$ | 1.345 | 1.507 | 1.888 | 5.141 | 3.106 | 3.335 | 5.515 | 4.982 | 3.352 |

It can be seen from Table 2 that the present method can achieve accurate registration and completion results for most objects. For example, the rotation errors of the airplane, the car and the ship are all below 10 degrees, moreover, the completion errors of these objects are also below $2 \times 10^{-3}$, which means that the quality of the reconstructed results obtained finally is high. The rotation error of the sofa is also below 10 degrees, but the completion error exceeds $3 \times 10^{-3}$. This is mainly due to the ambiguity caused by self-sliding of the incomplete scan of the sofa, such as a long annular sofa with a small opening. The registration error of the cabinet is high, which is mainly due to the ambiguity caused by its high symmetry. For example, an incomplete point cloud scanned from one side of the cabinet can be arbitrarily aligned with the left or the right. Similarly, the registration errors of these objects with high symmetry like the chair, the lamp and the table are higher than those of other objects. Especially for the lamp, most lamp holders are all cylindrical, thus causing rotation ambiguity. In addition, due to large geometric variations of the models of these objects, it is difficult to reconstruct the details of the models, such as different hollow shapes of the back of the chair. In general, the rotation error is below 15 degrees, and the registration error is 0.09, and the complement error is $3.35 \times 10^{-3}$.

In order to verify the rationality of the structure of the network and the loss function provided by the present application, ablation experiments are carried out. The principle of the ablation experiment is to control a certain parameter not to change one by one, and based on a result, to determine which parameter has more influence on the result. As shown in Table 3, for the structure of the network, a comparison is made between the network including the single registration-completion path and the network including the single completion-registration path are compared. In order to display the effectiveness of the present three consistency losses, the comparison is further made between the models which are trained by the loss function without one of the three consistency loss respectively.

TABLE 3

|   | Single R-C | Single C-R | Without $L_s^C$ | Without $L_s^R$ | Without $L_s^T$ | The present application |
|---|---|---|---|---|---|---|
| $E_\theta$ | 17.647 | 16.841 | 15.831 | 14.993 | 15.306 | 14.961 |
| $E_t$ | 0.142 | 0.088 | 0.093 | 0.087 | 0.090 | 0.084 |
| $E_c$ | 3.848 | 5.546 | 3.919 | 3.633 | 3.786 | 3.352 |

As shown in Table 3, the registration error (especially the shift error) of the single registration-completion path is much higher than that of the present method. The completion error of the single completion-registration path is 65% higher than that of the present method. On the basis of combining these two paths, three consistency loss functions are designed in the present invention. By comparing the errors in the last four columns of Table 3, it is verified that the consistency loss really enables the two paths to be enhanced with each other, thereby achieving a lowest error.

Figure 13:
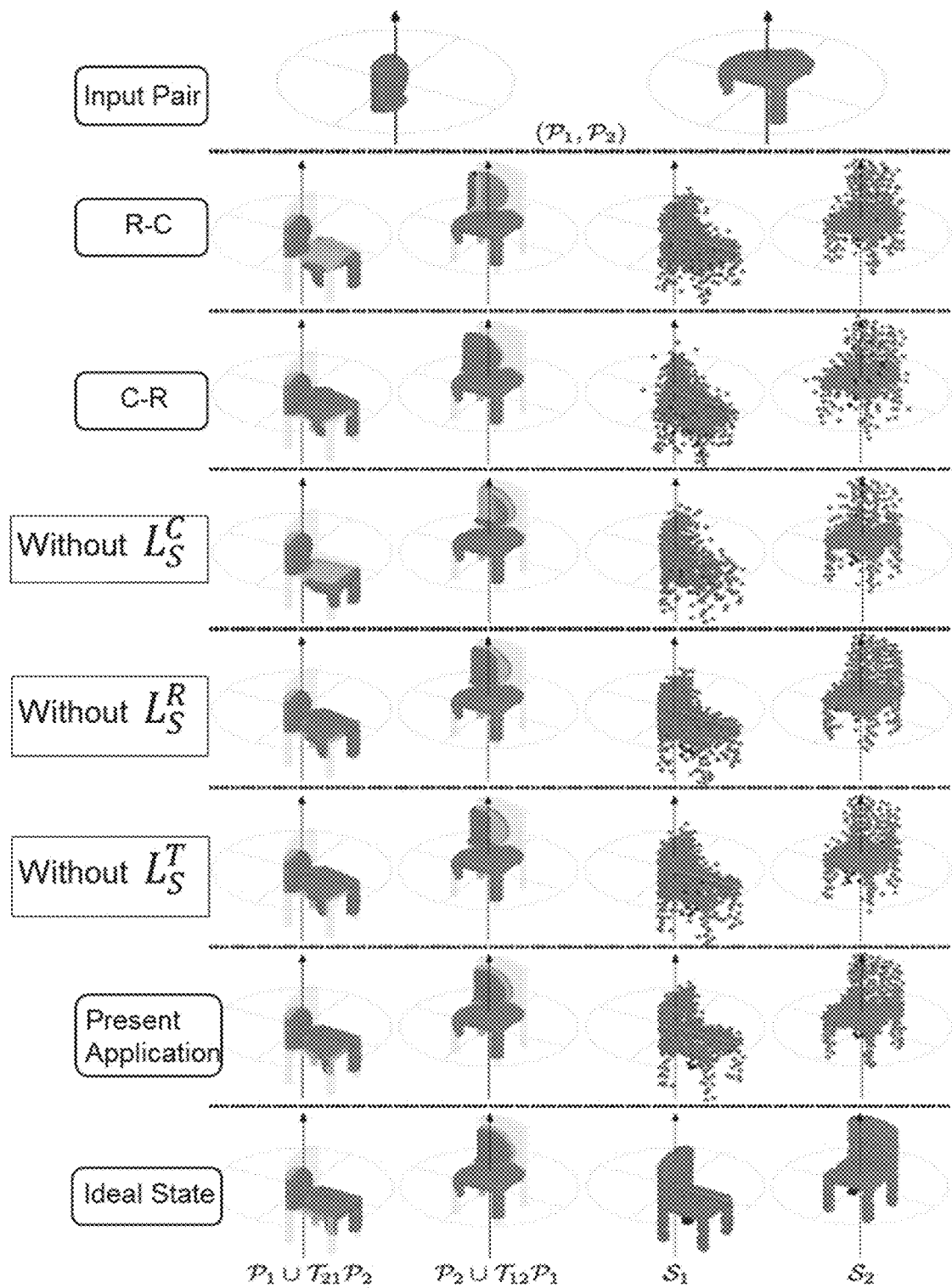
FIG. 13 is a schematic diagram illustrating a comparison result of an ablation experiment of an embodiment.

In order to illustrate the advantages of the two combined networks, a comparison can be made for three different methods by the ablation experiment. Please refer to FIG. 13, it visually shows the comparison result of the ablation experiment, in which the same input pair is used in different methods to complete and align a virtual chair. The input pair is shown in the first row, and the following rows are divided into two groups showing the registration results and the completion results respectively, and the last row shows the real appearance models of the object (which can be references for an appearance model effect in an ideal state).

It is observed that the registration error of the single registration-completion path is much larger than that of other methods, which indicates that it is a challenging task for the single registration-completion path to align two incomplete shapes directly. The single completion-registration path can achieve a better registration result, but the noise of the completion result is larger, which is mainly because it is very difficult to reconstruct a complete shape by using a single incomplete shape directly. The output result of the network obtained by combining the two paths is the best. It can be seen that, compared with the registration error and the completion error of the method of the present application, the registration error and the completion error of the network without the reconstruction consistency loss are high. The output results of the network without the registration consistency loss are similar to those of the method of the present application, but there are still some deformations in the reconstruction models, such as curved chair legs in the figure. The network without the parameter consistency loss leads to the difference between the two registration results, thus increasing the error of the prediction result.

It can be seen that the method of the present trains and uses the registration network combining with the compensation network, and uses the consistency loss function including three loss values of $L_s^C$, $L_s^R$ and $L_s^T$, accordingly the trained registration network and the trained compensation network have better performances, the obtained appearance model of the object is closest to the real appearance model of the object, and the prediction result is more accurate.

It should be understood that although the steps in the flow charts of FIGS. 2-10 are sequentially displayed as indicated by the arrows, these steps are not necessarily performed sequentially in the order indicated by the arrows. Unless expressly stated herein, the performing of these steps is not strictly sequential, and these steps can be performed in other sequences. Furthermore, at least a portion of the steps in FIGS. 2-10 can include a plurality of sub-steps or a plurality of stages. These sub-steps or stages are not necessarily performed at the same time, but can be performed at different times. These sub-steps or stages are also not necessarily performed sequentially, but can be performed in turn or alternately with at least a portion of other steps or the sub-steps or stages of other steps.

Figure 14:
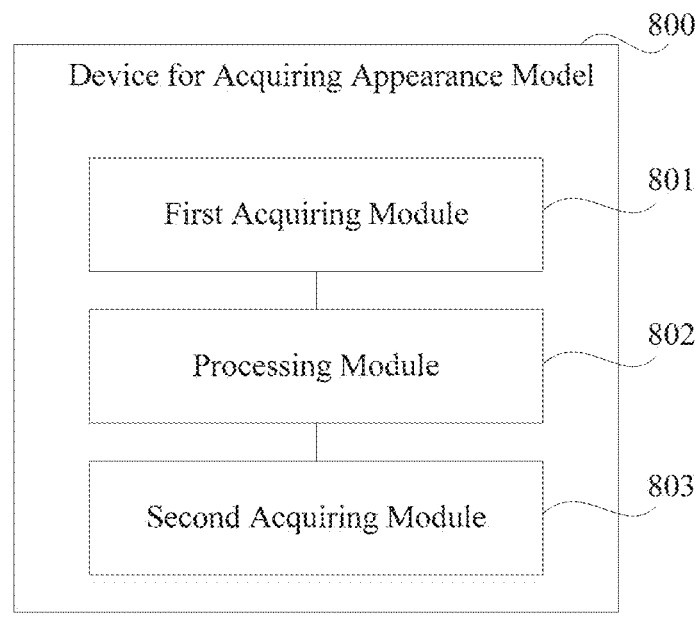
FIG. 14 is a structural block diagram illustrating an device for acquiring the appearance model of an embodiment.

In an embodiment of the present application, as shown in FIG. 14, a device 800 for acquiring an appearance model is provided. The device 800 for acquiring an appearance model includes a first acquiring module 801, a processing module 802, and a second acquiring module 803, wherein:

the first acquiring module 801 is configured to acquire a set of target point clouds, the set of target point clouds includes at least two point clouds, and each of the point clouds is acquired by sampling a local area of a target object;

the processing module 802 is configured to perform a registration and a completion for the at least two point clouds to obtain a processed point cloud, wherein the registration is to transform different point clouds into a same coordinate system, and the completion is to add points in other areas of the object according to existing points in a point cloud to be completed; and the second acquiring module 803 is configured to acquire the appearance model of the target object according to the processed point cloud.

In the embodiment of the present application, the processing module 802 is specifically configured to: perform the registration for the at least two point clouds to obtain a first aligned point cloud; perform the completion for the first aligned point cloud to obtain a first completed point cloud; and use the first completed point cloud as the processed point cloud.

In the embodiment of the present application, the processing module 802 is specifically configured to: perform the completion for the at least two point clouds respectively to obtain at least two second completed point clouds; perform the registration for the at least two second completed point clouds to obtain a second aligned point cloud; and use the second aligned point cloud as the processed point cloud.

In the embodiment of the present application, the registration includes inputting different point clouds into a registration network, and the registration network transforming the different point clouds into the same coordinate system; and the completion includes inputting the point cloud to be completed into a completion network, and the completion network adding points in other areas of the object according to the existing points in the point cloud to be completed.

In the embodiment of the present application, the registration network includes a first encoder and a first decoder, and the processing module 802 is specifically configured to: input the different point clouds into the first encoder to obtain first feature vectors of the different point clouds; merge the first feature vectors of the different point clouds to obtain a first merged feature vector; input the first merged feature vector into the first decoder to obtain transformation parameters between the different point clouds; and transform the different point clouds into the same coordinate system according to the transformation parameters.

In the embodiment of the present application, the completion network includes a second encoder and a second decoder, and the processing module is specifically configured to: input the point cloud to be completed into the second encoder to obtain a second feature vector of the point cloud to be completed; and input the second feature vector of the point cloud to be completed into the second decoder, and add points in other areas of the object according to the second feature vectors of the point cloud to be completed through the second decoder.

Figure 15:
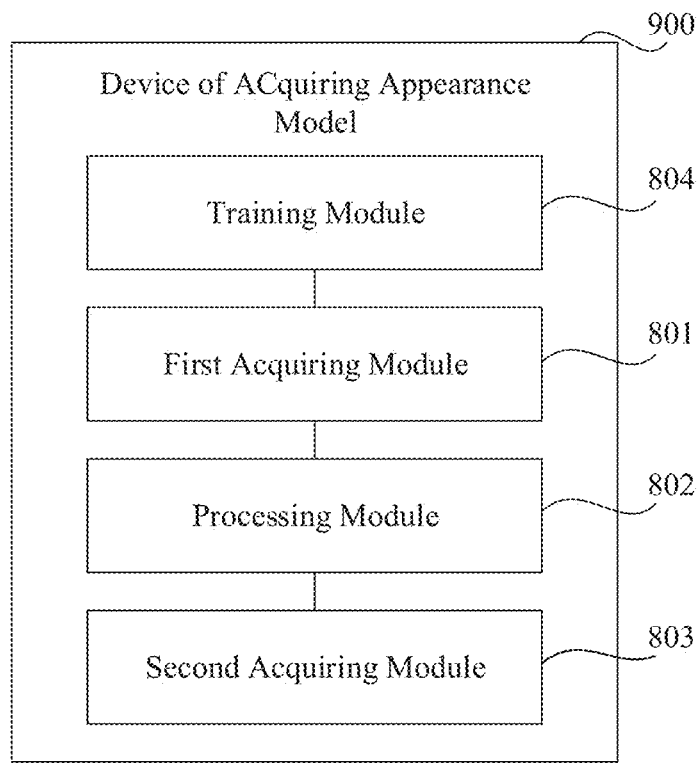
FIG. 15 is a structural block diagram illustrating an device for acquiring the appearance model of another embodiment.

In the embodiment of the present application, please refer to FIG. 15, another device 900 for acquiring the appearance model is provided. In addition to the modules included by the appearance acquiring model 800 described above, the device 900 for acquiring the appearance model optionally further includes a training module 804. The training module 804 is configured to: acquire a training data set and a verification data set, where the training data set and the verification data set includes complete appearance models of a plurality of objects; train an initial registration network and an initial completion network by using the training data set to obtain a trained registration network and a trained completion network; and input the verification data set into the trained registration network and the trained completion network, and calculate comprehensive loss values of the trained registration network and the trained completion network by using a loss function, where the comprehensive loss values includes a loss value of the trained registration network and a loss value of the trained completion network.

For the specific limitations of the device for acquiring the appearance model, please refer to the limitations of the method for acquiring the appearance model above, which will not be described here repeatedly. Each module in the device for acquiring the appearance model described above can be realized in whole or in part by software, hardware, and combinations thereof. The modules described above can be embedded in or independent of a processor in a computer device in hardware form, or can be stored in memory in the computer device in software form to make it convenient a processor to call and execute operations corresponding to each module described above.

Figure 16:
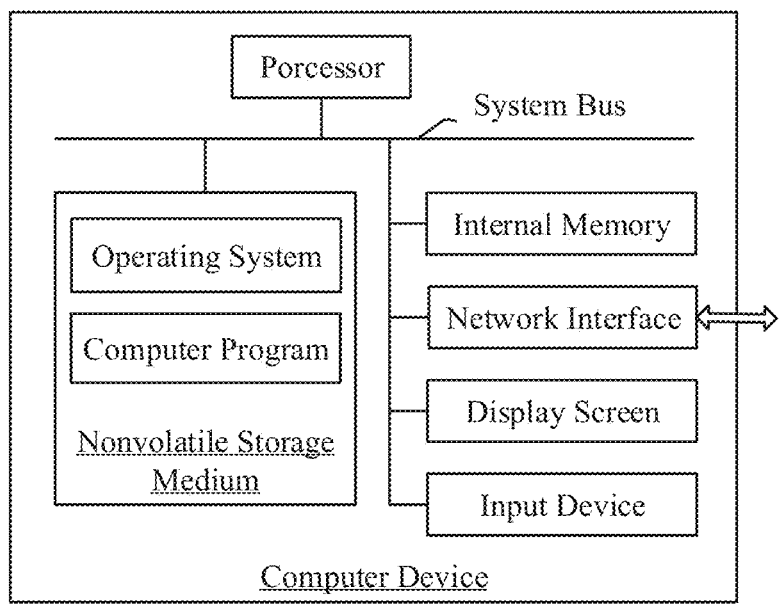
FIG. 16 is a diagram illustrating an internal structure of a computer device of an embodiment.

In an embodiment, a computer device is provided. The computer device can be a terminal, and its internal structure is shown in FIG. 16. The computer device includes a processor, a memory, a network interface, a display screen and an input device which are connected through a system bus. In the computer device, the processor is configured to provide computing and control capabilities. The memory of the computer device includes a nonvolatile storage medium and an internal memory. The nonvolatile storage medium stores an operating system and a computer program. The internal memory provides an environment for the running of the operating system and the computer program in the nonvolatile storage medium. The network interface of the computer device is configured to communicate with an external terminal through a network connection. The computer program is executed by the processor to implement the method for acquiring the appearance model. The display screen of the computer device can be a liquid crystal display screen or an electronic ink display screen. The input device of the computer device can be a touch layer covered on the display screen or a key, a trackball or a touch pad, which are provided on the housing of the computer device, and can also be an external keyboard, an external touch pad or an external mouse, etc.

It can be understood by those skilled in the art that the structure shown in FIG. 16 is merely a block diagram of a portion of the structure associated with the scheme of the present application, and does not constitute a limitation of the computer device to which the scheme of the present application is applied. The specific computing device can include more or fewer components than those shown in the figure, or can combine certain components, or has different component arrangements.

In an embodiment of the present application, a computer device is provided. The computer device includes a memory which stores a computer program, and a processor which implements the following steps when executing the computer program:

acquiring a set of target point clouds, the set of target point clouds including at least two point clouds, and each of the point clouds being obtained by sampling a local area of a target object;

performing a registration and a completion for the at least two point clouds to obtain a processed point cloud, wherein the registration is to transform different point clouds into a same coordinate system, and the completion is to add points in other areas of the object according to existing points in a point cloud to be completed; and acquiring the appearance model of the target object according to the processed point cloud.

In an embodiment of the present application, a computer-readable storage medium is provided, on which a computer program is stored, and the computer program implements the following steps when executed by a processor:

acquiring a set of target point clouds, the set of target point clouds including at least two point clouds, and each of the point clouds being obtained by sampling a local area of a target object;

performing a registration and a completion for the at least two point clouds to obtain a processed point cloud, wherein the registration is to transform different point clouds into a same coordinate system, and the completion is to add points in other areas of the object according to the existing points in a point cloud to be completed; and acquiring the appearance model of the target object according to the processed point cloud.

Those of ordinary skill in the art can understand that all or part of the flows implementing the method for the embodiments described above can be accomplished by instructing associated hardware through the computer program. The computer program can be stored in a nonvolatile computer-readable storage medium, and can include the flows of embodiments of the methods as described above when executed. Any reference to memory, storage, database or other medium used in the embodiments provided in the present application can include nonvolatile and/or volatile memory. The nonvolatile memory can include Read-Only Memory (ROM), Programmable ROM (PROM), Electrically Programmable ROM (EPROM), Electrically Erasable Programmable ROM (EEPROM), or flash memory. The volatile memory can include Random Access Memory (RAM) or external cache memory. As illustration and not limitation, RAM is available in various forms, such as Static RAM (SRAM), Dynamic RAM (DRAM), Synchronous DRAM (SDRAM), Dual Data Rate SDRAM (DDRSDRAM), Enhanced SDRAM (ESDRAM), Sync Link DRAM (SLDRAM), Rambus Direct RAM (RDRAM), Direct Rambus Dynamic RAM (DRDRAM), and Rambus Dynamic RAM (RDRAM), and the like.

The various technical features of the above embodiments can be arbitrarily combined. In order to simplify the description, not all possible combinations of the various technical features in the embodiments described above are described. However, as long as the combinations of these technical features are not contradictory, they should be considered within the scope described in this specification.

The embodiments described above are only several implementations of the present application, and the description of which is more specific and detailed, but cannot therefore be interpreted as limitation of the scope of the present disclosure. It should be noted that, for those of ordinary skill in the art, several modifications and improvements can be made without departing from the concept of the present application, all of the modifications and improvements fall within the protection scope of the present application. Therefore, the protection scope of the present application shall be subject to the appended claims.

What is claimed is:

1. A method for acquiring an appearance model, comprising:
   acquiring a set of target point clouds, wherein the set of target point clouds comprises at least two point clouds, each of the point clouds is obtained by sampling a local area of a target object;
   performing a registration and a completion for the at least two point clouds to obtain a processed point cloud, wherein the registration is to transform different point clouds into a same coordinate system, and the completion is to add points in other areas of the object according to existing points in a point cloud to be completed; and
   acquiring the appearance model of the target object according to the processed point cloud;
   wherein:
   the registration comprises inputting different point clouds into a registration network, and transforming, by the registration network, the different point clouds into the same coordinate system;
   the registration network comprises a first encoder and a first decoder; and
   the inputting the different point clouds into the registration network, and transforming, by the registration network, the different point clouds into the same coordinate system comprise:
   inputting the different point clouds into the first encoder to obtain first feature vectors of the different point clouds;
   merging the first feature vectors of the different point clouds to obtain a merged first feature vector;
   inputting the first merged feature vector into the first decoder to obtain transformation parameters between the different point clouds; and
   transforming, by the first decoder, the different point clouds into the same coordinate system according to the transformation parameters.

2. The method according to claim 1, wherein the performing the registration and the completion for the at least two point clouds to obtain a processed point cloud, comprises:
   performing the registration for the at least two point clouds to obtain a first aligned point cloud; and
   performing the completion for the first aligned point cloud to obtain a first completed point cloud, and using the first completed point cloud as the processed point cloud.

3. The method according to claim 1, wherein the performing the registration and the completion for the at least two point clouds to obtain a processed point cloud, comprises:
   performing the completion for the at least two point clouds respectively to obtain at least two second completed point clouds; and
   performing the registration for the at least two second completed point clouds to obtain a second aligned point cloud, and using the second aligned point cloud as the processed point cloud.

4. The method according to claim 1, wherein
   the completion comprises inputting the point cloud to be completed into a completion network, and adding, by the completion network, points in other areas of the object according to the existing points in the point cloud to be completed.

5. The method according to claim 4, wherein
   the completion network comprises a second encoder and a second decoder, and
   the inputting the point cloud to be completed into the completion network, and adding, by the completion network, points in the other areas of the object according to the existing points in the point cloud to be completed comprise:
   inputting the point cloud to be completed into the second encoder to obtain a second feature vector of the point cloud to be completed;
   inputting the second feature vector of the point cloud to be completed into the second decoder; and
   adding, by the second decoder, points in other areas of the object according to the second feature vector of the point cloud to be completed.

6. The method according to claim 4, wherein the method further comprises:
   acquiring a training data set and a verification data set, wherein the training data set and the verification data set each comprise complete appearance models of a plurality of objects;
   training an initial registration network and an initial completion network by using the training data set to obtain a trained registration network and a trained completion network; and
   inputting the verification data set into the trained registration network and the trained completion network, and calculating comprehensive loss values of the trained registration network and the trained completion network from a loss function, wherein the comprehensive loss values comprises a loss value of the trained registration network and a loss value of the trained completion network.

7. A computer device, comprising a memory and a processor, and computer programs stored in the memory, wherein the computer programs, when executed by the processor, cause the processer to perform the method of claim 1.

8. A non-transitory computer-readable storage medium, having computer programs stored thereon, wherein the computer programs, when executed by a processor, cause the processor to perform the method of claim 1.

9. A device for acquiring an appearance model, comprising:
   a first acquiring module, configured to acquire a set of target point clouds, wherein the set of target point clouds comprises at least two point clouds, and each of the point clouds is acquired by sampling a local area of a target object;
   a processing module, configured to perform a registration and a completion for the at least two point clouds to obtain a processed point cloud, wherein the registration is to transform different point clouds into a same coordinate system, and the completion is to add points in other areas of the object according to existing points in a point cloud to be completed;

a second acquiring module, configured to acquire the appearance model of the target object according to the processed point cloud;
a first encoder; and
a first decoder;
wherein the processing module is further configured to:
input the different point clouds into the first encoder to obtain first feature vectors of the different point clouds;
merge the first feature vectors of the different point clouds to obtain a merged first feature vector;
input the first merged feature vector into the first decoder to obtain transformation parameters between the different point clouds; and
transform, by the first decoder, the different point clouds into the same coordinate system according to the transformation parameters.

10. The device for acquiring an appearance model according to claim 9, wherein the processing module is configured to:
perform the registration for the at least two point clouds to obtain a first aligned point cloud; and
perform the completion for the first aligned point cloud to obtain a first completed point cloud, and using the first completed point cloud as the processed point cloud.

11. The device for acquiring an appearance model according to claim 9, wherein the processing module is configured to:
perform the completion for the at least two point clouds respectively to obtain at least two second completed point clouds; and
perform the registration for the at least two second completed point clouds to obtain a second aligned point cloud, and using the second aligned point cloud as the processed point cloud.

12. The device for acquiring an appearance model according to claim 9, wherein the device further comprises a second encoder and a second decoder; and
the processing module is configured to:
input the point cloud to be completed into the second encoder to obtain a second feature vector of the point cloud to be completed;
input the second feature vector of the point cloud to be completed into the second decoder; and
add, by the second decoder, points in other areas of the object according to the second feature vector of the point cloud to be completed.

13. The device for acquiring an appearance model according to claim 9, wherein the device further comprises a training module; and
the training module is configured to:
acquire a training data set and a verification data set, wherein the training data set and the verification data set each comprise complete appearance models of a plurality of objects;
train an initial registration network and an initial completion network by using the training data set to obtain a trained registration network and a trained completion network; and
input the verification data set into the trained registration network and the trained completion network, and calculating comprehensive loss values of the trained registration network and the trained completion network from a loss function, wherein the comprehensive loss values comprises a loss value of the trained registration network and a loss value of the trained completion network.

* * * * *